May 19, 1959   L. B. WILSON   2,887,079
JIG FOR STANDARD PIPE FLANGES
Filed Aug. 9, 1957

INVENTOR.
Leonard B. Wilson
BY Victor J. Evans & Co.
ATTORNEYS

United States Patent Office 2,887,079
Patented May 19, 1959

2,887,079
JIG FOR STANDARD PIPE FLANGES
Leonard B. Wilson, Compton, Calif.
Application August 9, 1957, Serial No. 677,342
2 Claims. (Cl. 113—104)

This invention relates to a flange jig, and more particularly to a flange jig for use with pipes.

The object of the invention is to provide a jig which will hold flanges in the proper position, as for example when the flanges are being welded to pipes.

Another object of the invention is to provide a jig which includes a pair of sections that are adjustably connected together whereby the jig will accommodate pipes of different sizes or shapes, such as pipes which are straight or pipes which have the form of an elbow, and wherein there is provided a means for holding the flanges in their proper position so that such flanges can be readily secured as by welding to the pipes and after the flanges have been welded to the pipes, the jig can be removed so that the jig can be used over and over again.

A further object of the invention is to provide a pipe flange jig which is extremely simple and inexpensive to manufacture.

Other objects and advantages will be apparent during the course of the following description.

In the accompanying drawings, forming a part of this application, and in which like numerals are used to designate like parts throughout the same.

Figure 1:
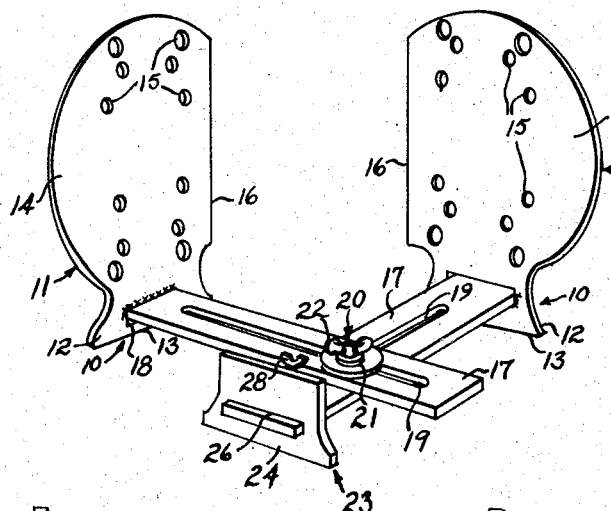
Figure 1 is a perspective view of the pipe flange jig, showing the sections adjusted or arranged to accommodate a pipe having the shape of an elbow.
Figure 4:
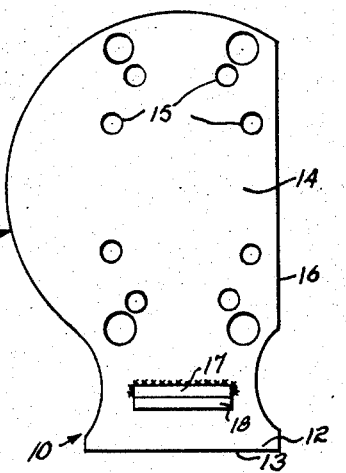
Figure 4 is an elevational view illustrating one of the plates and bars.

Referring in detail to the drawings, the pipe flange jig of the present invention includes a pair of adjustable sections which are each indicated generally by the numeral 10. Each of the sections 10 includes a vertically disposed plate 11 which is provided with a lower portion 12 that has a flat bottom surface 13 so that the jig can be readily supported on a workbench, table or other supporting structure. Each plate 11 further includes an upper portion 14 which has a somewhat rounded shape as shown in Figures 1 and 4 for example, and a portion of each of the plates 11 may be cut away so as to provide a straight edge 16.

Extending outwardly from each of the plates 11 and secured thereto as by welding, is a horizontally disposed bar 17. A portion of each plate 11 adjacent the bar 17 is cut out as at 18.

It will be seen that there is provided a pair of the bars 17, there being one of the bars 17 for each of the vertically disposed plates 11. Each bar 17 is provided with a longitudinally extending slot 19, and a bolt and nut assembly 20 is provided for adjustably connecting the bars 17 together. The bolt and nut assembly 20 includes a bolt 21 which extends through the registering slots 19, and a wing nut 22 is arranged in threaded engagement with the upper end of the bolt 21. Suitable washers may be mounted on the bolt 21.

Figure 2:
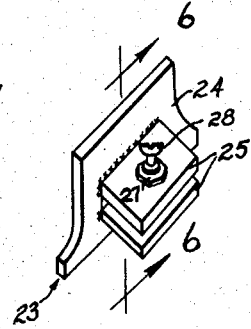
Figure 2 is a perspective view of the support member for use with the set up of Figure 1.
Figure 3:
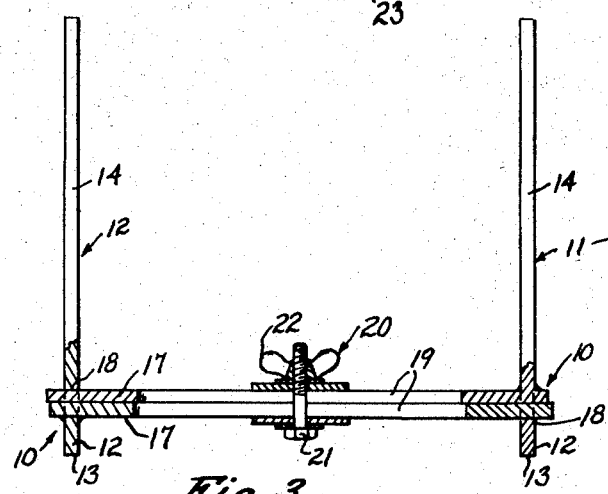
Figure 3 is a vertical sectional view taken through the jig, and showing the jig adjusted to accommodate or receive a straight section of a pipe.
Figure 5:
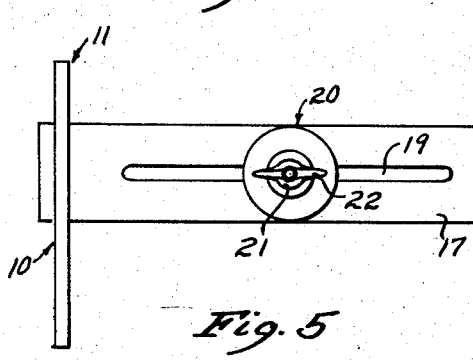
Figure 5 is a top plan view of the assembly shown in Figure 3.
Figure 6:
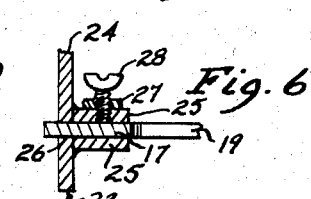
Figure 6 is a sectional view taken on the line 6—6 of Figure 2, and showing one of the bars projecting through the support member.

As shown in Figures 2 and 6, there is further provided a support member which is indicated generally by the numeral 23, and the support member 23 includes a vertically disposed leg 24 which has a pair of horizontally disposed spaced parallel flanges or lugs 25 extending outwardly therefrom and secured thereto. There is provided in the leg 24 a slit or cutout 26 for receiving the end portion of one of the bars 17. A screw member 28 extends through a lock nut 27, and through the uppermost flange 25 and into engagement with the bar 17 as shown in Figure 6 so as to maintain the support member 23 connected to the bar 17. The support member 23 provides a support for the jig when the parts are in the position shown in Figure 1 whereby the pipe and flanges will be maintained in a level position, as for example when the flanges are being welded to the pipe. In the arrangement shown in Figure 1, an elbow is adapted to be received or accommodated and it will be seen that in the arrangement shown in Figure 1 the bars 17 are arranged angularly with respect to each other so as to provide a support for such an elbow. In Figures 3 and 5 the support 23 is not used and the bars 17 are arranged in alignment with respect to each other so that a straight section of pipes can be supported thereon whereby flanges can be readily welded to such a straight piece of pipe. The openings or holes 15 are adapted to have suitable securing elements such as bolts extended therethrough whereby such bolts can be extended through registering holes or openings in the flanges being welded whereby these flanges will be held in proper position against the pipe sections so that the flanges and pipe sections can be accurately welded together. As shown in Figures 1 and 4 for example, the hole or openings 15 are spaced apart or staggered so that regardless of the position of the holes in the flanges, the holes 15 are arranged so that they will register with at least some of the holes in the flanges whereby the flanges can be properly supported during the welding operation.

From the foregoing, it is apparent that there has been provided a jig which is especially suitable for use in holding pipes and flanges in their proper aligned position, as for example, when such pipes and flanges are being welded together. In use, with the parts arranged as shown in Figure 1 for example, it will be seen that an L-shaped piece of pipe may be supported on the angularly arranged bars 17. The bars 17 are connected together by means of the bolt and nut assembly 20 wherein the bolt 21 extends through the registering slots 19. The flanges which are to be welded are adapted to be arranged contiguous to the inner surfaces of the plates 11, and the flanges are provided with the usual bolt holes therein. Suitable securing elements such as bolts are adapted to be extended through the openings 15 and through the usual bolt holes in the flanges whereby the flanges will be maintained in their proper position with respect to the pipe section which rests on or which is supported on the bars 17. Then, with the flanges 17 being supported thusly, such flanges can be readily welded to the pipe sections, and after the welding operation is completed, the jig can be removed wherein the flanges will be properly secured to the pipe section. By loosening the wing nut 22, the bolt and nut assembly 20 can be loosened so that the bars 17 can be moved to different adjusted positions whereby pipe sections of different shapes or sizes can be readily accommodated. When the parts are in the position shown in Figure 1, the support member 23 is used and one of the bars 17 has its end portion projecting through the slit 26 in the leg 24 of the support member 23. The screw member 28 extends through the upper flange 25 and into engagement with the adjacent portion of the bar 17 so as to maintain the support member 23 connected to the bar and the support member 23 serves to provide a support for the jig whereby the bars and consequently the pipe section will be supported in the proper level position during welding operation.

When a straight piece of pipe is being welded, the parts are arranged as shown in Figures 3 and 5 so that the support member 23 is not needed or used. Thus, to weld flanges on a straight piece of pipe, the screw member 28 is unloosened whereby the support member 23 can be readily removed from engagement with the corresponding bar 17. Then, the wing nut 22 is loosened and the bars 17 are moved from the position shown in Figure 1 to the position shown in Figures 3 and 5 and it will be seen that in the positions of Figures 3 and 5 the pair of bars 17 are arranged in aligned relation with respect to each other, one above the other. Then, the wing nut 22 is tightened whereby the bars 17 will be maintained immobile in their adjusted position. Thus, with the parts in the position of Figures 3 and 5, a straight section of pipes can be supported on the bars 17 and the flanges to be welded are again connected to the plates 11 by means of suitable bolts which extend through the openings 15 and through the usual bolt holes in the flanges. Thus, such flanges can be readily welded to a straight section of pipes and after the welding operation is completed, the jig is removed. When the parts are in the position shown in Figures 3 and 5, it will be seen that one of the bars 17 is arranged above the other bar 17, and the cutouts 18 in the plates 11 serve to receive end portions of the corresponding bars so that the parts are further steadied.

Due to the provision of the plurality of staggered or spaced apart openings 15, standard pipe flanges can be readily supported or handled. The slots 19 provide a means whereby the bars 17 can be adjusted as desired. High pressure flanges may be used when this type of bolt hole centers are drilled. The part can be made of any suitable material and in different shapes or sizes. Thus, by means of the slots 19, the effective lengths of the jig can be varied or changed whereby pipe sections of different sizes can be readily accommodated. The bolt and nut assembly 20 serves to hold the parts in their proper position after they have been adjusted. The holes 15 are arranged so that different sizes of flanges can be accommodated, as for example, 3, 4, and 6 inch flanges may be accommodated. The nut 27 may be welded to the uppermost flange 25. The support member 23 serves to keep the jig level while in working position. The flange jig of the present invention will hold flanges in the square and level position for tack welding to 90° L's, with flanges on each end and variable degrees and length, in straight spools of different lengths, and flanges of different sizes can be accommodated.

I claim:

1. In a pipe flange jig, a pair of vertically disposed plates arranged in spaced apart relation with respect to each other, each of said plates including a lower flat surface to correspond with the flat surface of a supporting structure, an upper rounded portion and a vertically disposed straight edge at right angles to said lower flat surface, there being a plurality of spaced apart openings in the upper portions of said plates, sets of said openings being selectively utilized at one time to accommodate various sizes of pipe fittings, a horizontally disposed bar extending from each of said plates and secured thereto, each of said plates being provided with a cutout adjacent said bar, said cutouts being adapted to selectively receive the ends of the bars to permit the adjustment of said plates in relation to each other, there being longitudinally extending slots in said bars, and an adjustable securing element extending through said slots.

2. In a pipe flange jig, a pair of vertically disposed plates arranged in spaced apart relation with respect to each other, each of said plates including a lower flat surface to correspond with the flat surface of a supporting structure, an upper rounded portion and a vertically disposed straight edge at right angles to said lower flat surface, there being a plurality of spaced apart openings in the upper portions of said plates, sets of said openings being selectively utilized at one time to accommodate various sizes of pipe fittings, a horizontally disposed bar extending from each of said plates and secured thereto, there being longitudinally extending slots in said bars, an adjustable securing element extending through said slots, a support member including a vertically disposed leg arranged adjacent the end of one of said bars, a pair of spaced parallel horizontally disposed flanges extending from said leg and secured thereto, and said flanges being arranged on opposite sides of one of said bars, there being a slit in said leg between said flanges for projection therethrough of said one bar, and a screw member extending through the uppermost flange and engaging said one bar.

References Cited in the file of this patent

UNITED STATES PATENTS

| | | |
|---|---|---|
| 842,077 | Parker | Jan. 22, 1907 |
| 2,431,101 | Woods | Nov. 18, 1947 |
| 2,585,343 | Newlon | Feb. 12, 1952 |